(12) United States Patent
Mostachetti et al.

(10) Patent No.: US 9,811,426 B2
(45) Date of Patent: Nov. 7, 2017

(54) MANAGING BACK UP OPERATIONS FOR DATA

(71) Applicant: International Business Machines Corporation, Armonk, NY (US)

(72) Inventors: Marianne J. Mostachetti, Hyde Park, NY (US); Peter G. Sutton, Lagrangeville, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 14/753,578

(22) Filed: Jun. 29, 2015

(65) Prior Publication Data

US 2015/0301904 A1    Oct. 22, 2015

Related U.S. Application Data

(60) Division of application No. 13/672,917, filed on Nov. 9, 2012, now Pat. No. 9,092,377, which is a continuation of application No. 13/248,251, filed on Sep. 29, 2011, now abandoned.

(51) Int. Cl.
*G06F 17/30* (2006.01)
*G06F 11/14* (2006.01)

(52) U.S. Cl.
CPC ...... *G06F 11/1461* (2013.01); *G06F 11/1448* (2013.01); *G06F 11/1458* (2013.01); *G06F 11/1464* (2013.01)

(58) Field of Classification Search
None
See application file for complete search history.

(56) References Cited

U.S. PATENT DOCUMENTS

| | | | |
|---|---|---|---|
| 6,928,444 B2 | 8/2005 | Richard | |
| 7,139,808 B2 | 11/2006 | Anderson et al. | |
| 7,177,992 B2 * | 2/2007 | Kappler | G06F 11/2069 711/162 |
| 7,461,227 B2 | 12/2008 | Kobayashi et al. | |
| 7,495,614 B2 | 2/2009 | Scanlan | |
| 7,827,147 B1 * | 11/2010 | D'Hoye | G06F 11/1464 707/652 |

(Continued)

FOREIGN PATENT DOCUMENTS

WO    WO9849626    11/1998

OTHER PUBLICATIONS

Copeland, Lee, "Start-up Helps Ensure Better Data Backups," Computerworld, Jan. 28, 2002.

(Continued)

*Primary Examiner* — Wilson Lee
(74) *Attorney, Agent, or Firm* — Fleit Gibbons Gutman Bongini Bianco PL; Thomas S. Grzesik

(57) ABSTRACT

Backup operations for data resources can be managed as follows. At least one data resource residing on at least one data storage device is identified. An information processing system automatically determines that the at least one data resource fails to be associated with a backup policy. In response to the at least one data resource failing to be associated with a backup policy, at least one backup policy is associated with the at least one data resource.

13 Claims, 6 Drawing Sheets

(56) References Cited

U.S. PATENT DOCUMENTS

| | | | |
|---|---|---|---|
| 8,806,062 B1* | 8/2014 | Vertongen | H04L 29/08783 709/247 |
| 8,903,777 B1* | 12/2014 | Searls | G06F 17/3007 707/665 |
| 2004/0148306 A1 | 7/2004 | Moulton et al. | |
| 2005/0055520 A1* | 3/2005 | Kappler | G06F 11/2069 711/162 |
| 2006/0085425 A1* | 4/2006 | Lauer | G06F 17/30067 |
| 2006/0129615 A1* | 6/2006 | Derk | G06F 11/1464 |
| 2007/0233900 A1 | 10/2007 | Bartlett et al. | |
| 2008/0040508 A1* | 2/2008 | Rosenberg | H04L 65/1073 709/239 |
| 2009/0063794 A1 | 3/2009 | Green | |
| 2009/0249006 A1 | 10/2009 | Boldt et al. | |
| 2010/0095150 A1 | 4/2010 | Dickens et al. | |
| 2010/0169287 A1* | 7/2010 | Klose | G06F 11/1453 707/692 |
| 2010/0333166 A1* | 12/2010 | Herrod | H04L 41/0813 726/1 |
| 2011/0145199 A1* | 6/2011 | Prasad Palagummi | G06F 11/1469 707/654 |
| 2011/0238626 A1 | 9/2011 | Hao et al. | |
| 2011/0246735 A1* | 10/2011 | Bryant | G06F 11/1448 711/162 |
| 2011/0295811 A1* | 12/2011 | Cherkasova | G06F 11/3419 707/654 |
| 2011/0314072 A1 | 12/2011 | Resch et al. | |
| 2012/0254130 A1 | 10/2012 | Mitra et al. | |
| 2013/0066837 A1 | 3/2013 | Colrain et al. | |

OTHER PUBLICATIONS

U.S. Appl. No. 12/822,835, filed Jun. 24, 2010 Butler, et al.
Non-Final Office Action dated Mar. 28, 2013 received for U.S. Appl. No. 13/248,251.

* cited by examiner

| DATA RESOURCE | BACK UP STATUS | POLICY | BACKUP AGENT | ... |
|---|---|---|---|---|
| RESOURCE_1 310 | BACKED UP 316 | P_A 320 | BA_A 326 | ... |
| RESOURCE_2 312 | BACKED UP | P_A P_B 322 | BA_A BA_B 328 | ... |
| ... | | | | ... |
| ... | | | | ... |
| ... | | | | ... |
| RESOURCE_N 314 | NOT BACKED UP 318 | N/A 324 | N/A 330 | ... |

FIG. 3

MANAGING BACK UP OPERATIONS FOR DATA

CROSS-REFERENCE TO RELATED APPLICATIONS

This application is a divisional of and claims priority from U.S. application Ser. No. 13/672,917 filed on Nov. 9, 2012, which is a continuation of and claims priority from prior U.S. patent application Ser. No. 13/248,251 filed on Sep. 29, 2011, the entire disclosures of each are herein incorporated by reference in its entirety.

FIELD OF THE INVENTION

The present invention generally relates to backing up data, and more particularly relates to managing backup operations.

BACKGROUND OF THE INVENTION

Client Information Technology (IT) infrastructures typically have a diverse set of hardware platforms (e.g. IBM System z, IBM System p, IBM System x, Sun, HP, Dell), Operating Systems (e.g. z/OS, zVM, Linux, Windows, Solaris, HP Unix) and middleware (DB2 for z/OS, DB2 LUW, Oracle, Websphere, SAP, etc.). Each of these computing platforms provides its own unique value for providing function, performance, and manageability with respect to executing the workloads necessary to meet the needs of the business. IT clients typically often require a robust infrastructure and middleware for reliably backing up data. Reliably backing up data comprises a number of attributes such as completing a backup operation within an allowed period of time, resilience from transient errors, efficient utilization of IT resources to maximize affordability and value, verification that the data that is backed up is actually available to be restored at a later time, and the ability to keep an audit trail identifying the data that has been backed up.

SUMMARY OF THE INVENTION

In one embodiment, a method for managing backup operations for data resources is disclosed. The method comprises identifying at least one data resource residing on at least one data storage device is identified. An information processing system automatically determines that the at least one data resource fails to be associated with a backup policy. In response to the at least one data resource failing to be associated with a backup policy, at least one backup policy is associated with the at least one data resource.

In another embodiment, another method for managing backup operations for data resources is disclosed. The method comprises identifying at least one data resource residing on at least one data storage device. An information processing system automatically determines that the at least one data resource is associated with a backup policy. In response to the at least one data resource being associated with a backup policy, the at least one data resource is determined to be associated with two or more backup agents. In response to the at least one data resource being associated with two or more backup agents, only one of the two or more backup agents is reassigned to the at least one data resource.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 illustrates one example of information that can be presented to a user identifying devices/resources that have not been backed up and/or are associated with multiple backup policies/operations according to one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Operating Environment

Figure 1:
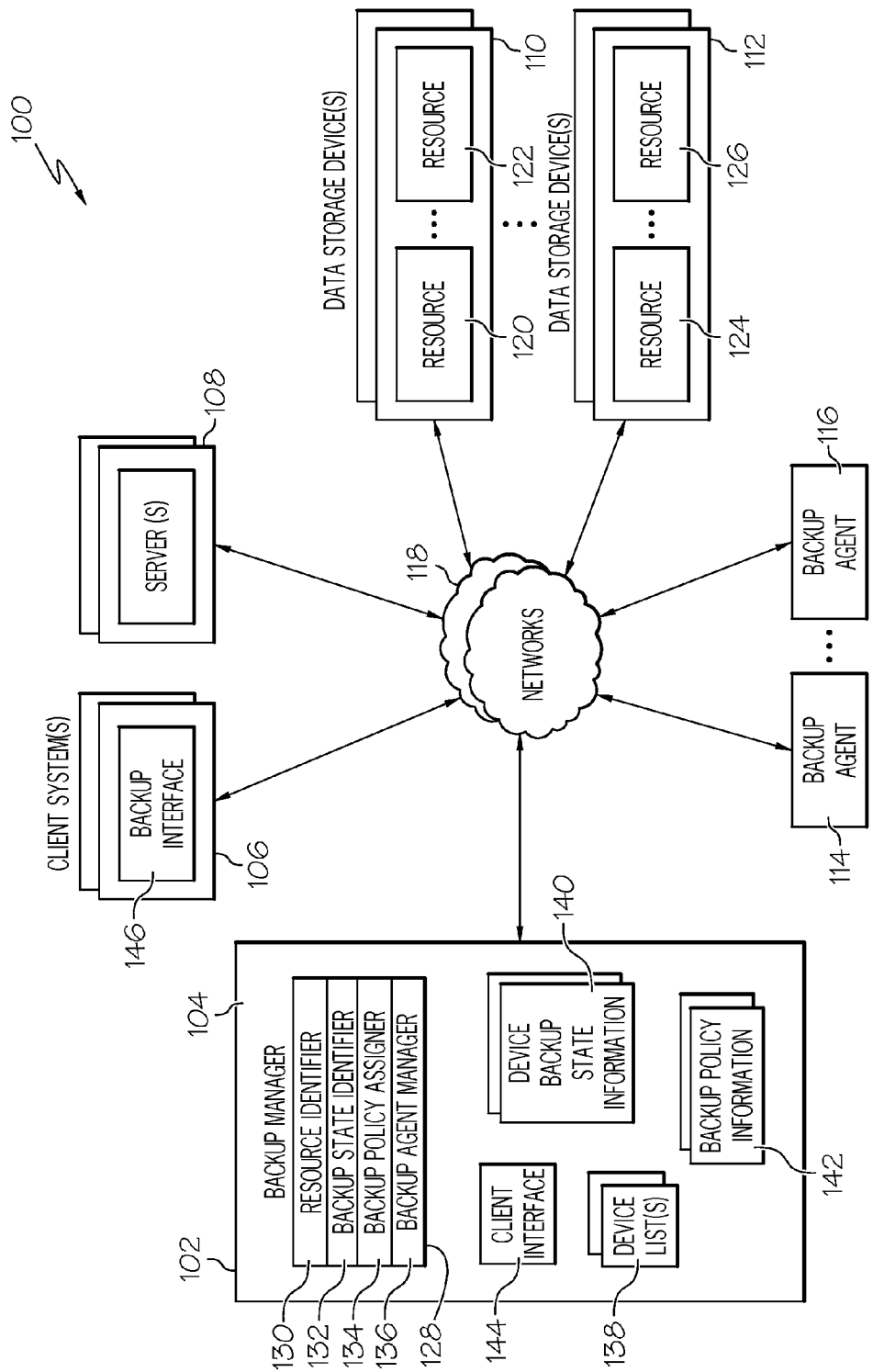
FIG. 1 is a block diagram illustrating one example of an operation environment for managing backup operations according to one embodiment of the present invention.

According to one embodiment, FIG. 1 illustrates a general overview of one operating environment 100 for managing backup operations of data. In this embodiment, the operating environment 100 comprises one or more information processing systems 102 comprising a backup manager 104. The information processing system(s) 102 is communicatively coupled to one or more client systems 106, servers 108, data storage devices 110, 112, and backup agents 114, 116 via one or more networks 118. The one or more networks 118 can comprise wired and/or wireless networks that are based on any known (or future) networking technologies such as, but not limited to, a Fibre Channel (FC), Internet Protocol (IP), SAN, and other networking technologies.

In one embodiment, the servers 108 host the data storage devices 110, 112. Stated differently, the servers 108 have access to one or more resources 120, 122, 124, 126 (e.g., files or other data) residing on the data storage devices 110, 112. In one embodiment, one or more of the data storage devices 110, 112 accessible by the servers 108. In another embodiment one or more of the data storage devices 110, 112 are communicatively coupled to the servers 108 via one or more of the networks 118, as shown in FIG. 1. For example, one or more of the data storage devices 110, 112 can be coupled to a server(s) 108 via a storage area network (SAN), FC network etc. Other configurations are application as well. In one embodiment, the data storage devices 110, 112 can be magnetic based storage devices, optical based storage devices, solid state storage devices, direct access storage devices, and the like.

The backup agents 114, 116 perform one or more backup operations on the data storage devices 110, 112 based on one or more backup policies associated with the devices 110, 112 and/or resources 124, 126 stored thereon. In one embodiment, the backup agents 114, 116 are federated backup agents. A backup operation makes copies of the resources 120, 122, 124, 126, which can be used to either restore the resources after a data loss event or recover data from an earlier time according to a data retention policy. It should be noted that the backup agents 114, 116 can reside locally on a server 108 and or remotely from a server 108, as shown in FIG. 1.

Conventional backup systems are generally only concerned with resources associated with a backup policy. Stated differently, conventional backup systems only backup resources associated with a backup policy. These conventional systems typically do not provide any automated mechanisms for identifying resources that are not associated with a backup operation. This is especially problematic in enterprise systems that can comprise tens of thousands of data storage devices. The vast number of data storage devices and resources makes it almost impossible for a human to identify and locate resources currently not associated with a backup policy.

Therefore, in one embodiment, the information processing system 102 comprises a backup manager 128 that automatically identifies resources 120, 122, 124, 126 within a data storage device 110, 112 that are not associated with a backup policy and/or a backup operation. It should be noted that the information processing system 102, in one embodiment, is a backup server that manages the backup operations being performed in the environment 100. In another embodiment, the information processing system 100 is a system that is remote and communicatively coupled to a backup server.

The backup manager 128, in one embodiment, comprises a device/resource identifier 130, a backup state identifier 132, a backup policy processor 134, and a backup agent manager 136. The device/resource identifier 130 identifies one or more data storage devices 110, 112 and/or resources 120, 122, 124, 126 within the environment 100. The backup state identifier 132 determines a current backup state of individual resources 120, 122, 124, 126 residing on a data storage device 110, 112, or a current backup state of the data storage devices 110, 112 themselves. This backup state can indicate whether or not a resource and/or data storage device is associated with a backup policy (or operation). The backup policy processor 134 associates one or more backup policies to a resource (or data storage device) that has been identified to be in a non-backed-up state. It should be noted that, in one embodiment, the backup policy processor 134 automatically assigns a backup policy to the resource. For example, the backup policy processor 134 can assign a policy currently assigned to a similar resource to the identified resource. In another embodiment, the backup policy processor 134 assigns a policy to the identified resource that has been selected by a user.

The backup agent manager 136 manages the backup agents 114, 116. For example, the backup agent manager 136 interfaces with each backup agent 114, 116 and obtains data generated by each backup agent 114, 116 such as, but not limited to, backup operation reports that identify the resources/devices that have been backed up and the corresponding backup policies that were followed when performing the backup operations. It should be noted that one or more of the above components of the backup manager 128 can be implemented within a backup agent 114, 116. For example, the backup agents 114, 116 can identify devices/resources within the environment 100 and communicate this information to the backup manager 128.

In addition to the backup manager 128, the information processing system 102 also comprises one or more device lists 138 that identify the data storage devices 110, 112 and/or resources 120, 122, 124, 126 within the environment 100. Device backup state information 140 and backup policy information 142 can also be stored within the information processing system 102 as well. It should be noted that one or more of the device lists 138, device backup state information 140, and backup policy information 142 can also be stored on one or more of the servers 108 as well.

The information processing system 102 further comprises a client interface 144 that allows a user of the client system 106 to interact with the system 102 via a backup interface 146. The backup manager 128 is able to communicate and receive various types of information to/from the user via the client interface 144. For example, the backup manager 128, via the client interface 144, can send a list of identified devices/resources that are not being backed up to the client system 106. This list can be displayed to the user via the backup interface 146. The user, via the backup interface 146, is then able to select one or more backup policies to be applied to the identified devices/resources. This information is then stored by the backup manager 128 in the backup policy information 142. It should be noted that other information can be transmitted to/from the information processing system 102 and client system 106 as well.

Automatic Detection of Backup Candidates

The following is a more detailed discussion on automatically detecting and identifying devices/resources that fail to be associated with a backup policy and/or operation. As discussed above, enterprise systems can comprise tens of thousands of data storage devices. These data storage devices can reside at different locations and across different platforms. Unfortunately, this results in many of the devices/resources failing to be associated with a backup policy/operation. In addition, devices/resources may be associated with multiple backup agents. This unnecessarily leads to duplicate backup operations being performed on the same devices/resources.

Figure 2:
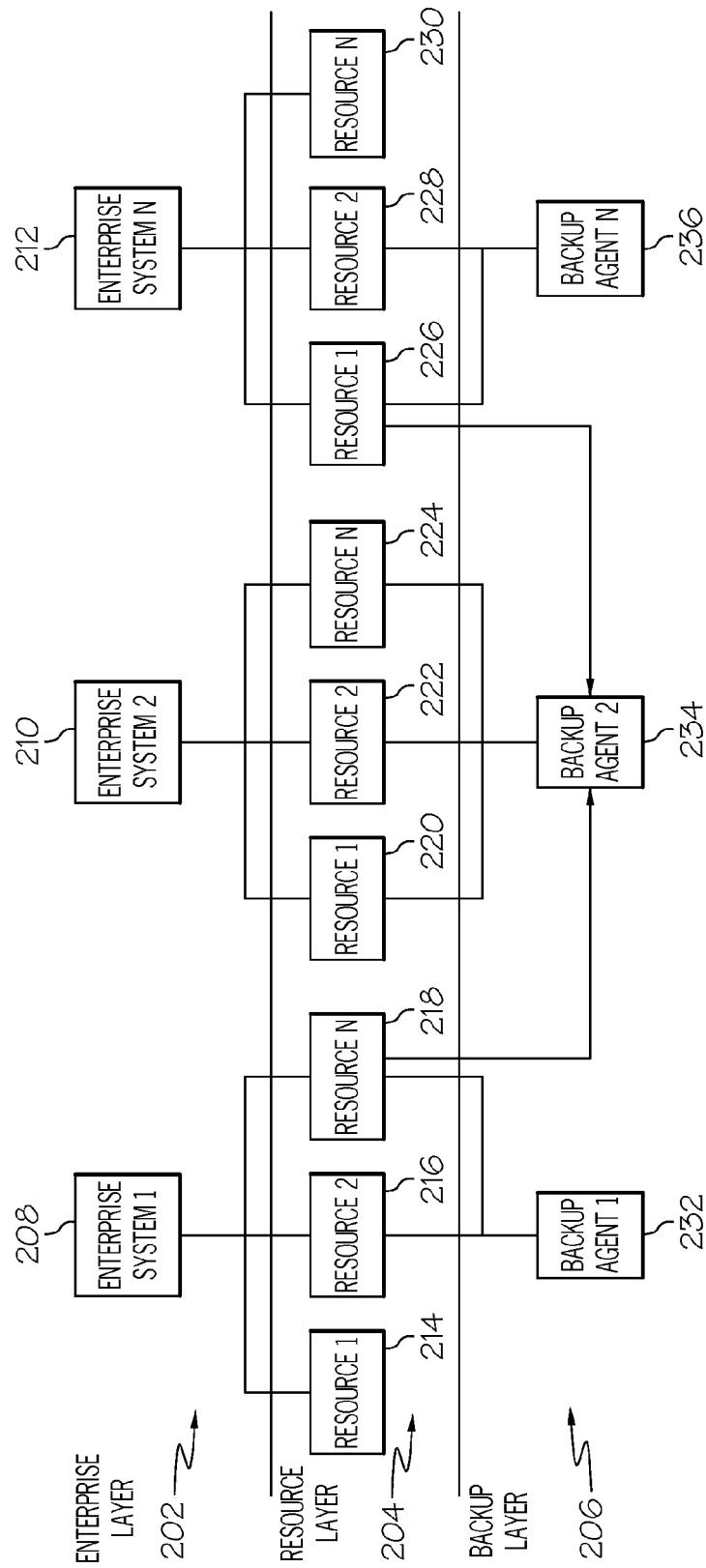
FIG. 2 illustrates one example of a backup configuration for an enterprise operating environment according to one embodiment of the present invention.

For example, FIG. 2 shows one example of a backup configuration for an enterprise operating environment. In particular, FIG. 2 shows an Enterprise Layer 202, a Resource Layer 204, and a Backup Layer 206. The Enterprise Layer 202 comprises a plurality of enterprise systems 208, 210, 212, such as the server(s) 108 shown in FIG. 1, each hosting a plurality of data storage devices 110, 112 (not shown in FIG. 2). As discussed above, each of the data storage device 110, 112 comprises a plurality of resources 214 to 230 shown in the Resource Layer 204. The Backup Layer 206 shows a backup agent 232, 234, 236 associated with each enterprise system 208, 210, 212 for performing one or more backup services on the resources 214 to 230 (or devices comprising the resources).

As can be seen in FIG. 2 one or more resources 214, 230 are not associated with any backup agent/service 232, 234, 236. Therefore these resources 214, 230 will not be backed up. In addition, one or more resources 218, 226 are associated with multiple backup agents 232, 234, 236, which results in duplicate backup operations to be performed on these resources 218, 226. However, the backup manager 128 is able to automatically identify the resources 214, 230 (and devices) that are currently not being backed up and the resources 218, 226 associated with duplicated backup operations. The backup manager 128 can then automatically resolve these problems and/or prompt a user to resolve these problems.

In one embodiment, the backup manager 128, via the device/resource identifier 103 (or a backup agent 114 being managed by the backup manager 128), identifies each device 110, 112 within the operating environment 100. For example, each device 110, 112 communicatively coupled to a host system/processor such as the server(s) 108 is identified. Once a device 110, 112 is identified the device 110, 112 can be analyzed to identify its resources 120, 1122, 124, 126. It should be noted that any method for discovering devices in a network can be utilized. It should also be noted that these discovery methods can vary depending on the configuration of the operating environment 100.

For example, in an IBM System z® environment devices can be discovered using messages such as existing, well-known I/O commands and new I/O commands such as Test Initialization Capability (TINC) commands (See "FC-SB-5: Support for I/O Discovery: Proposed Changes to the FC-SB-4 Specification", IBM July 2011, which is hereby incorporated by reference in its entirety). In this environment type, the fabric is explored through each attached channel or other communication path on each node in the cluster to determine all of the device entities, such as physical or logical control units and I/O devices, to which a logical path can be established. Each device entity is discovered by interrogating and exploring the network nodes to discover all physical endpoints, such as destination ports, followed by utilizing commands configured to interrogate each endpoint via each available channel or path to receive configuration data for each logical device entity. A more detailed discussion on the above discovery process is given in the co-pending and commonly owned U.S. patent application Ser. No. 12/822,835 entitled "Discovery and Configuration of Device Configurations", which is hereby incorporated by reference in its entirety.

The following is an example of another device discovery process that can be utilized in other distributed environments. For each channel (host bus adapter) the device/resource identifier 130 issues a Get Port Identifiers (GID_FT) command to the well known address of the fabric name server (xFFFFFE) to obtain the first port address. The device/resource identifier 130 then issues a Get All Next (GA_NXT) command to get the next port address. The device/resource identifier 130 is then able to obtain every port address that is reachable from this channel. For each FC port address, the device/resource identifier 130 issues the Small Computer System Interface (SCSI) "Report LUNs" command to the well known LUN number (standard). Now, at this point a list of all valid LUNs (Logical Unit Numbers) has been retrieved by the device/resource identifier 130. For each LUN, the device/resource identifier 130 issues a SCSI Inquiry Command to get device dependent attributes. At this point, all devices accessible by the server have know been discovered by the device/resource identifier 130. It should be noted that the above examples of a device discovery process are non-limiting and other device discovery process are applicable as well.

As part of the discovery process the device/resource identifier 130 also identifies the unique identifier associated with each discovered device. At least this unique identifier and/or the name of the discovered device are stored in the device list 138 for identifying discovered devices. The device/resource identifier 130 can also identify other information associated with each discovered device. For example, the device/resource identifier 130 can perform a hashing function on a discovered device that uniquely summarizes the data within a discovered device/resource. This hash value can also be stored within the device list 138 as well.

Once the devices/resources within the operating environment 100 are discovered, the backup state identifier 132 of the backup manager 128 then determines which of these discovered devices are currently not being backed-up. For example, as the backup agents 114, 116 perform backup operations on devices/resources the agents 114, 116 generate backup information associated with the backup operations. This backup information, in one embodiment, identifies the devices/resources that were backed-up, backup policies associated with the devices/resources, backup agents performing the backup operations, and the like. The backup state identifier 132 receives this backup information from each of the backup agents 114, 116. The backup state identifier 132 then analyzes this backup information and compares the devices/resources identified within the backup information to the discovered device list 138. Based on this comparison the backup state identifier 132 can identify the discovered devices/resources that have not been backed up.

The backup state identifier 132 associates a backup state 140, e.g., backed-up or not backed up, with each of the discovered devices based on this comparison process. The backup state identifier 132 can also store information 142 corresponding to a back-up policy and/or backup agent associated with each backed up device/resource, which is provided in the backup information received from a backup agent 114, 116. The backup manager 128 can then present this information to a user of the client system 106 via the backup interface 146.

In addition to receiving backup information from the backup agents 114, 116 the backup manager 128 (and/or the backup agents 114, 116) can also monitor various activities with respect to the discovered devices/resources. For example, the backup manager 128 can monitor file system mounting activities. In this example, for every file system mount request the backup manager 128 can record the file system name, mount point, and the set of worldwide unique device identifiers on which the file system resides. For every file OPEN request, the backup manager 128 record the file name, time stamp, and the set of worldwide unique device identifiers on which the file system resides. The backup manager 128 can also calculate the hash vale for the file. When the backup process starts the backup manager 128 can verify that every file system ever mounted is still accessible and can be backed up. For those file systems not mounted, the backup manager 128 records an identifier of the file system and the set of worldwide unique device identifiers on which the file system resides. With respect to each dataset, the backup manager 128 determines if the dataset is cataloged. For every dataset found, the backup manager 128 records the dataset name, hash value, and the set of worldwide unique device identifiers on which the file resides. The backup manager 128 also records the time stamp for the last OPEN request. Cataloging datasets allows the datasets to be referenced without the application requiring knowledge of the device on which the dataset resides on.

FIG. 3 shows one example of the information that can be maintained by the backup manger 128 and used for presenting backup related information to the user. This information is based on the discovered device list 138, the backup state information 140, and the backup policy information 142. In particular, FIG. 3 shows a table 300 comprising a first column 302 entitled "Data Resource", a second column 304 entitled "Backup Status", a third column 306 entitled "Policy", and a fourth column 308 entitled "Backup Agent". The first column 302 comprises a plurality of entries that identify discovered devices/resources. For example, a first entry 310 under this column 302 identifies Resource_1, a second entry 312 identifies Resource_2, and a third entry 314 identifies Resource_N. It should be noted that the device on which the resource resides can also be identified and presented to the user as well.

The second column 304 comprises a plurality of entries that indicate whether or not a discovered device/resource identified in the first column 302 is associated with a backup operation. For example, a first entry 316 under this column 304 indicates that Resource_1 is associated with a backup operation. However, a second entry 318 under this column 304 indicates that Resource_N is not associated with a backup operation.

The third column 306 comprises a plurality of entries identifying one or more backup policies associated with each of the discovered devices/resources under the first column 302. For example, a first entry 320 under this column 306 indicates that Resource_1 is associated with backup policy P_A. A second entry 322 under this column 306 indicates that Resource_2 is associated with backup policies P_A and P_B. It should be noted that in some instances the backup information provided by a backup agent 114, 116 may not include backup policy information for a device/resource that has been backed up. In this situation, policy information is not included for the discovered device/resource.

As can be seen in FIG. 3, Resource_2 is associated with two backup policies. Therefore, Resource_2 is being backed up twice. The backup manager 128 can automatically delete unnecessary backup policies from being associated with Resource_2 so that Resource_2 is only being backed up based on one policy. Alternatively, the backup manager 128 can prompt the user to resolve or verify this association with more than one backup policy. The backup manager 128 then updates the backup policy information 142 based on the user input.

A third entry 324 indicates that Resource_N is not associated with a backup policy. This indicates that Resource_N is not currently being backed up. Therefore, the backup policy processor 134 can automatically assign a backup policy to Resource_N. Alternatively, the backup manager 128 can notify the user that Resource_N is not associated with a backup policy/operation and prompt the user to assign a backup policy to Resource_N. The backup manager 128 then updates the backup policy information 142 associated with Resource_N to reflect this updated backup policy information.

The fourth column 308 comprises a plurality of entries that identify the backup agents 114, 116 associated with each of the discovered devices/resources under the first column 302. For example, a first entry 326 under this column 308 indicates that backup agent BA_A is associated with Resource_1. A second entry 328 under this column 308 indicates that backup agent BA_A and backup agent BA_B are associated with Resource_2. This association with more than one backup agent can indicate that unnecessary backup operations are being performed on Resource_2. Therefore, the backup agent manager 128 can automatically delete unnecessary backup agents from being associated with Resource_2. Alternatively, the backup manager 128 can prompt the user to rectify this conflict. The backup agent manager 126 then updates the backup policy information 142 based on the user input. A third entry 330 under this column 306 indicates that Resource_N is not associated with any backup agent since Resource_N is currently not associated with a backup operation.

As can be seen, the backup manager 128 is able to identify devices/resources that are currently not associated with any backup operations based on the backup information generated by backup agents 114, 116. The backup manager 128 also identifies any unnecessary backup operations being performed on devices/resources. This can either be determined by detecting multiple backup policies and/or backup agents being associated with a device/resource. The backup manager 128 either prompts a user to resolve these problems/conflicts and/or automatically resolves these problems/conflicts itself.

It should be noted that the backup manager 128 can identify devices/resources that are currently not associated with a backup operations by other mechanisms than analyzing the backup information generating by backup agents 114, 116. For example, the backup manager 128 can determine that a discovered device/resource is not accessible. If a discovered device/resource is determined to be inaccessible the backup manager 128 flags this device/resource as a non-backed up device. A discovered device/resource can be inaccessible for many reasons. For example, if the discovered device/resource is a file system in a SAN, the file system is determined to be inaccessible when it becomes unmounted. In another example, a discovered device/resource can be flagged as inaccessible in response to the backup manager 128 determining that a unit control block is not associated with the discovered device/resource.

Operational Flow Diagrams

Figure 4:
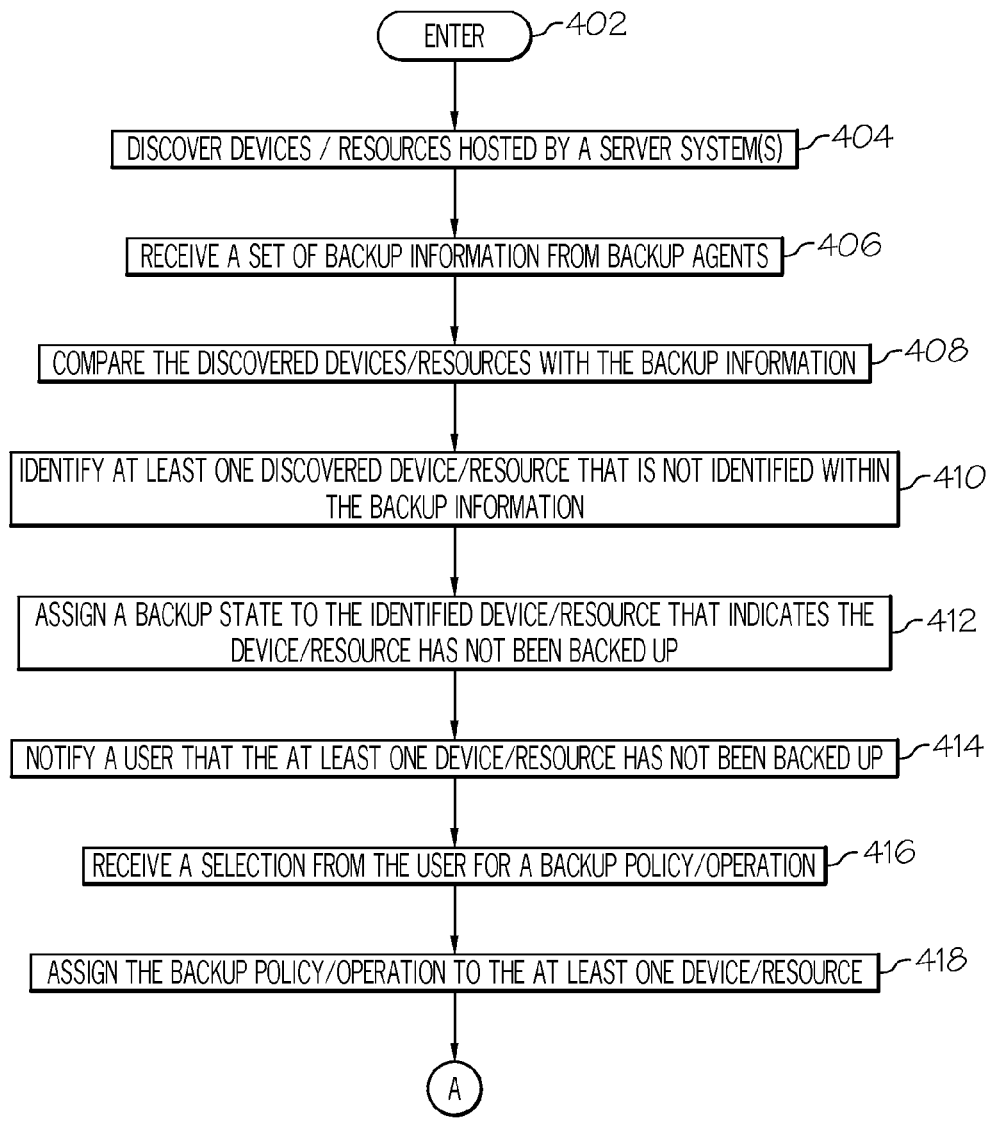
FIGS. 4-5 are operational flow diagrams illustrating one process for managing backup operations according to one embodiment of the present invention.

FIG. 4 is an operational flow diagram illustrating one process for identifying devices/resources that have not been backed up. The operational flow begins at step 402 and flows directly to step 404. The backup manager 128, at step 404, queries a plurality of server systems to discover one or more devices/resources hosted by each server system 108. The backup manager 128, at step 406, receives a set of backup information from a set of backup agents associated with each of the server systems 108. This backup information identifies at least each device/resource backed up by the backup agents 114, 116. The backup manager 128, at step 408, compares the discovered devices/resources to the backup information. The backup manager 128, at step 410, identifies at least one discovered device/resource that is not identified within the backup information. The backup manager 128, at step 412, assigns a backup state to the at least one device/resource indicating that it has not been backed up.

Figure 5:
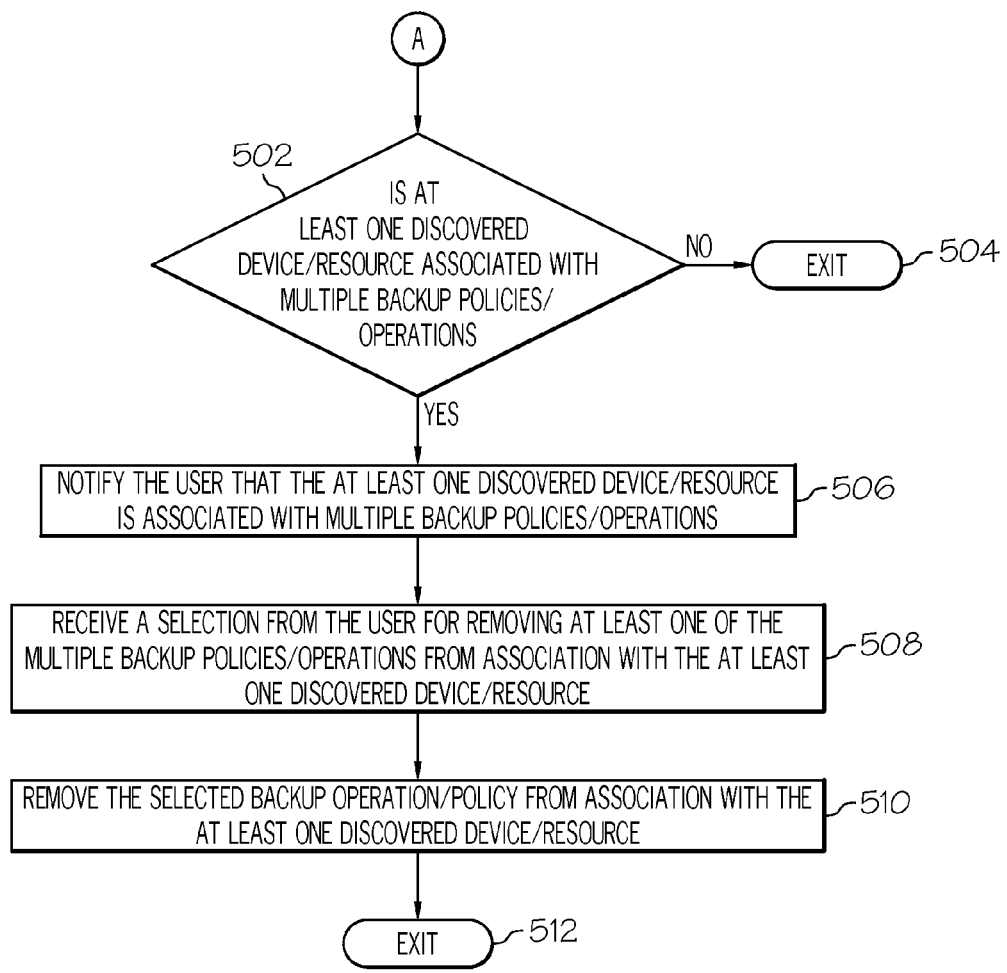

The backup manager 128, at step 414, then notifies the user of the at least one device/resource that has not been backed up. The backup manager 128, at step 416, receives a backup policy/operation selection from the user. The backup manager 128, at step 418, assigns this policy/operation to the at least one device/resource. It should be noted that the backup manager 128 can also automatically assign a backup policy/operation to the device/resource without receiving the selection from a user. The control then flows to entry point A of FIG. 5.

The backup manager 128, at step 502, also determines if any device/resource identified within the backup information is associated with more than one backup operation. If the result of this determination is negative, the control flow exits at step 504. If the result of this determination is positive, the backup manager 128, at step 506, notifies the user of the multiple policy/operation association. The backup manager 128, at step 508, receives a selection from the user of a policy/operation to be removed from associated with the at least one resource/device. The backup manager 128, at step 510, then removes the selected policy/operation from association with the at least one device/resource. It should be noted that the backup manager 128 can also automatically remove a backup policy/operation from association with the device/resource without receiving the selection from a user. The control flow then exits at step 512.

Information Processing System

Figure 6:
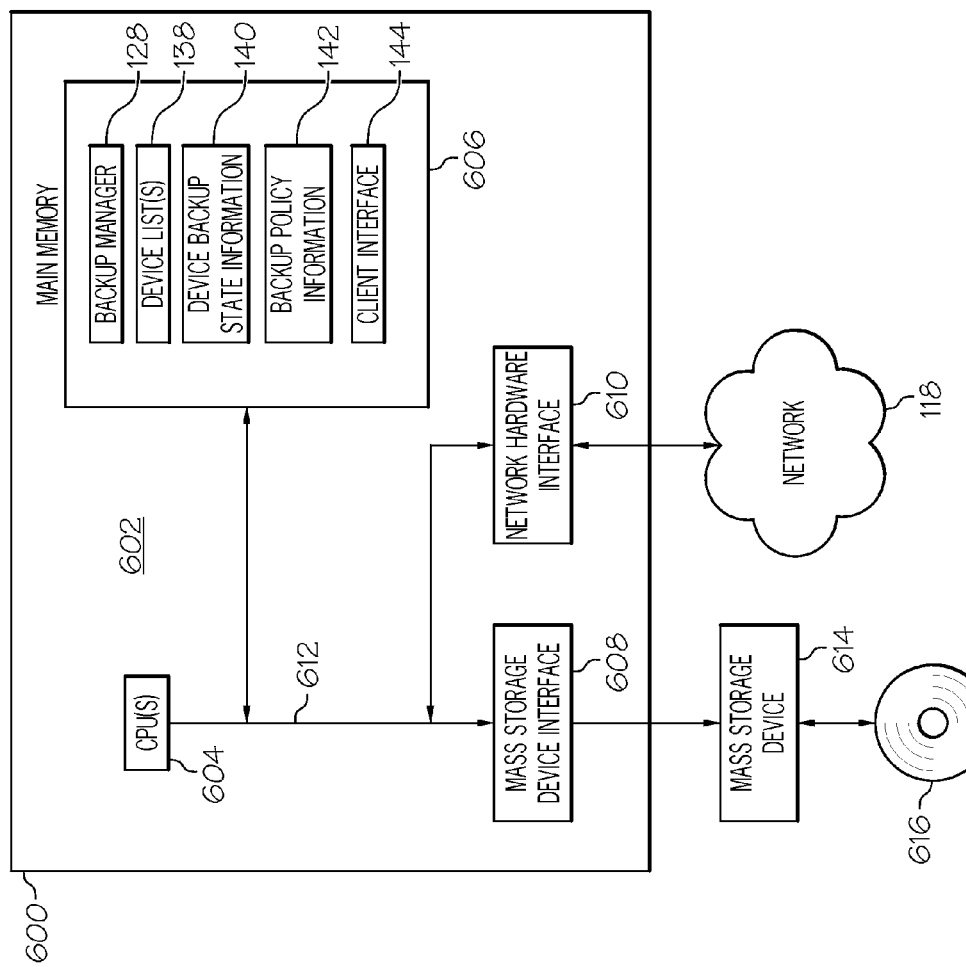
FIG. 6 is a block diagram illustrating a more detailed view of an information processing system according to one embodiment of the present invention.

FIG. 6 is a block diagram illustrating an information processing system that can be utilized in embodiments of the present invention. The information processing system 600 is based upon a suitably configured processing system adapted to implement one or more embodiments of the present invention (e.g., the system 102 of FIG. 1). Any suitably configured processing system can be used as the information processing system 600 in embodiments of the present invention.

The information processing system 600 includes a computer 602. The computer 602 has a processor(s) 604 that is connected to a main memory 606, mass storage interface 608, and network adapter hardware 610. A system bus 612 interconnects these system components. Although only one CPU 604 is illustrated for computer 602, computer systems with multiple CPUs can be used equally effectively. The main memory 606, in this embodiment, comprises the backup manager 128 and its components, the device list(s) 138, the device backup state information 140, the backup policy information 142, and the client interface 144.

The mass storage interface 608 is used to connect mass storage devices, such as mass storage device 614, to the information processing system 600. One specific type of data storage device is an optical drive such as a CD/DVD drive, which can be used to store data to and read data from a computer readable medium or storage product such as (but not limited to) a CD/DVD 616. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 600. The network adapter hardware 610 is used to provide an interface to a network 118. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, CD-ROM, or other form of recordable media, or via any type of electronic transmission mechanism. Also, aspects of the present invention may take the form of an entirely hardware embodiment, an entirely software embodiment (including firmware, resident software, micro-code, etc.), or an embodiment combining software and hardware aspects that may all generally be referred to herein as a "circuit" "module" or "system".

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing backup operations for data resources, the method comprising:

identifying at least one data resource residing on at least one data storage device;

automatically determining, with an information processing system, that the at least one data resource is associated with a backup policy, wherein the backup policy at least indicates that at least one backup operation is to be performed for the at least one data resource;

based on the at least one data resource being associated with a backup policy, determining that the at least one data resource is associated with two or more backup agents, where each backup agent of the two of more backup agents performs a duplicate instance of the at least one backup operation for the at least one data resource; and based on the at least one data resource being associated with two or more backup agents, reassigning only one of the two or more backup agents to the at least one data resource, wherein the reassigning prevents each of the two or more backup agents not reassigned to the at least one data resource from performing the at least one backup operation.

2. The method of claim 1, further comprising:
notifying a user, via a graphical user interface, that the resource is associated with two or more backup agents.

3. The method of claim 1, wherein determining that the at least one data resource is associated with a backup policy comprises:
comparing an identifier associated with the at least one data resource with a list of identifiers associated with data resources assigned to at least one backup policy; and
determining that the list contains the identifier associated with the at least one data resource.

4. The method of claim 1, wherein determining that the at least one data resource is associated with two or more backup agents comprises:
receiving a first set of information associated with a first backup process performed by a first of the two or more backup agents;
receiving a second set of information associated with a second backup process performed by a second of the two or more backup agents;
comparing the first set of information and the second set of information; and
determining, in response to the comparing, that the first set of information and the second set of information each comprise an identifier associated with the at least one resource.

5. The method of claim 1, wherein identifying the at least one data resource comprises:
querying a network;
receiving, in response to the querying, a list of data storage devices coupled to the network;
analyzing each data storage device; and
obtaining, in response to the analyzing, a list of data resources residing on each of the data storage devices.

6. A computer program product for managing backup operations for data resources, the computer program product comprising a non-transitory computer readable storage medium having computer readable program code embodied therewith, the computer readable program code comprising computer readable program code configured to perform a method comprising:
identifying at least one data resource residing on at least one data storage device;

automatically determining, with an information processing system, that the at least one data resource is associated with a backup policy, wherein the backup policy at least indicates that at least one backup operation is to be performed for the at least one data resource;

based on the at least one data resource being associated with a backup policy, determining that the at least one data resource is associated with two or more backup agents, where each backup agent of the two of more backup agents performs a duplicate instance of the at least one backup operation for the at least one data resource; and based on the at least one data resource being associated with two or more backup agents, reassigning only one of the two or more backup agents to the at least one data resource, wherein the reassigning prevents each of the two or more backup agents not reassigned to the at least one data resource from performing at least one backup operation.

7. The computer program product of claim 6, wherein determining that the at least one data resource is associated with a backup policy comprises:
comparing an identifier associated with the at least one data resource with a list of identifiers associated with data resources assigned to at least one backup policy; and
determining that the list comprises the identifier associated with the at least one data resource.

8. The computer program product of claim 6, wherein determining that the at least one data resource is associated with associated with two or more backup agents comprises:
receiving a first set of information associated with a first backup process performed by a first of the two or more backup agents;
receiving a second set of information associated with a second backup process performed by a second of the two or more backup agents;
comparing the first set of information and the second set of information; and
determining, based on comparing, that the first set of information and the second set of information each comprise an identifier associated with the at least one resource.

9. A system for managing backup operations for data resources, the system comprising:
a memory device;
a hardware-based processor communicatively coupled to the memory; and
a backup manager communicatively coupled to the memory and the processor, wherein the backup manager is configured to perform a method comprising:
identifying at least one data resource residing on at least one data storage device;
automatically determining, with an information processing system, that the at least one data resource is associated with a backup policy, wherein the backup policy at least indicates that at least one backup operation is to be performed for the at least one data resource;
based on the at least one data resource being associated with a backup policy, determining that the at least one data resource is associated with two or more backup agents, where each backup agent of the two of more backup agents performs a duplicate instance of the at least one backup operation for the at least one data resource; and based on the at least one data resource being associated with two or more backup agents, reassigning only one of the two or more backup agents to the at least one data resource, wherein the reassigning prevents each of the two or more backup agents not reassigned to the at least one data resource from performing the at least one backup operation.

10. The system of claim 9, wherein the method further comprises:
   notifying a user, via a graphical user interface, that the resource is associated with two or more backup agents.

11. The system of claim 9, wherein determining that the at least one data resource is associated with a backup policy comprises:
   comparing an identifier associated with the at least one data resource with a list of identifiers associated with data resources assigned to at least one backup policy; and
   determining that the list contains the identifier associated with the at least one data resource.

12. The system of claim 9, wherein determining that the at least one data resource is associated with two or more backup agents comprises:
   receiving a first set of information associated with a first backup process performed by a first of the two or more backup agents;
   receiving a second set of information associated with a second backup process performed by a second of the two or more backup agents;
   comparing the first set of information and the second set of information; and
   determining, in response to the comparing, that the first set of information and the second set of information each comprise an identifier associated with the at least one resource.

13. The system of claim 9, wherein identifying the at least one data resource comprises:
   querying a network;
   receiving, in response to the querying, a list of data storage devices coupled to the network;
   analyzing each data storage device; and
   obtaining, in response to the analyzing, a list of data resources residing on each of the data storage devices.

* * * * *